(No Model.)
G. W. SUTFIN.
MILK STRAINER.
No. 262,149.  Patented Aug. 1, 1882.
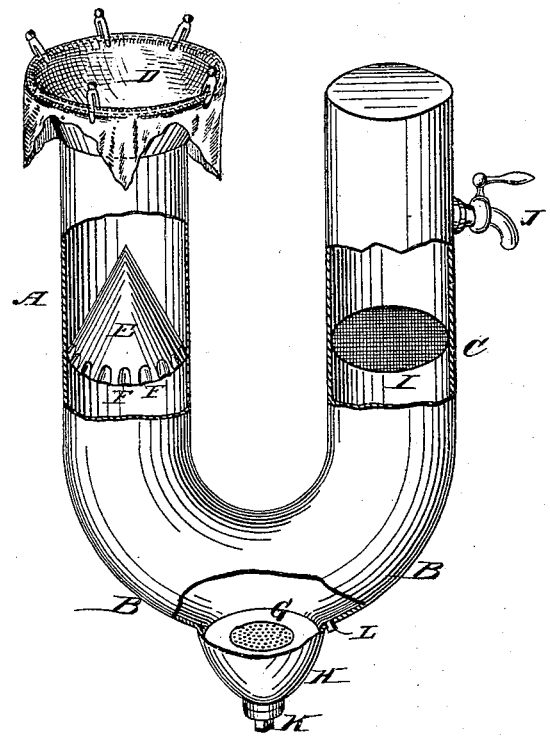
WITNESSES:
Francis McArdle
C. Sedgwick
INVENTOR:
G. W. Sutfin
BY Munn & Co
ATTORNEYS.

UNITED STATES PATENT OFFICE.

GEORGE W. SUTFIN, OF DUNDEE, ILLINOIS.

MILK-STRAINER.

SPECIFICATION forming part of Letters Patent No. 262,149, dated August 1, 1882.

Application filed April 11, 1882. (No model.)

*To all whom it may concern:*

Be it known that I, GEORGE W. SUTFIN, of Dundee, in the county of Kane and State of Illinois, have invented a new and Improved Milk-Strainer, of which the following is a full, clear, and exact description.

My invention consists of a milk-strainer the main body of which is formed like an inverted siphon, at the bottom of which a small strainer and pocket are located to collect the sediment deposited from the milk, the receiving side being provided with a deflecting cone to break the fall of the milk when poured in, and the delivering side provided with a fine strainer, through which the milk passes upward to the drawing-faucet.

Reference is to be had to the accompanying drawing, forming a part of this specification, in which my improved strainer is represented in perspective view with some parts in section.

A represents an upright cylindrical receiver, which connects by a return-bend trap-section, B, with a similar upright cylindrical strainer-section, C, into which the milk passes for being finally strained and discharged. On the top of receiver A a coarse cloth or other equivalent strainer, D, is temporarily applied for separating any coarse foreign matters when the milk is poured in from the milker's bucket.

E is a conical partition in the receiver, with small orifices F around its base to break the force of the milk poured in at the top of the receiver and prevent too much disturbance of the milk in the bend B below where the sediment-strainer G is located over the pocket H.

I is a fine strainer, located in the part C of the strainer for the milk to pass through from below upward, so that it will part naturally from the sediment, and the sediment will fall away from the strainer, whereas in the common method of straining by pouring the milk downward through the strainer the milk tends to wash the sediment along with it, and that which may at first lodge on the strainer becomes disintegrated, and to a large extent passes along with the milk.

From the chamber C the milk is drawn off through the cock J, being more thoroughly strained than by the common contrivances. The inverted siphon or U form of the body of the device, provided with a receiving-opening at one of its top ends and a discharge-faucet near the other top end, forces all the milk to pass through the downward bend and be strained in passing upward, and by the introduction of milk at intervals, as gathered by the milkers, a corresponding amount is each time pressed out at the opposite end, so all the milk is allowed some time to settle in passing over the sediment-pocket. Each measure has a period of rest in the strainer for allowing the sediment to settle into the pocket H, from where it may be cleaned out by removing the cap K after the last measure has been poured in and allowed to stand awhile. The strainer may be carefully tilted up for emptying what will not flow out through cock J.

The device E, for breaking the force of the falling milk, may be used or not, as preferred, as the strainer will be very effectual without it, and a tap or plug, L, of any approved form, may be inserted in the bend of the strainer, just above pocket H, from which to draw the remaining milk instead of tilting the strainer to cause it to flow from cock J, as above described.

Having thus described my invention, I claim as new and desire to secure by Letters Patent—

1. In a milk-strainer, the U-shaped body A B C, provided with a strainer, I, in its upward bend C, and an outlet, J, above said strainer, as shown and described.

2. The combination, with the U-shaped body A B C and strainer I, of the pocket H in the bottom of the bend B, as shown and described.

3. The combination, with the U-shaped body A B C, of the deflecting-cone E in the receiving side A and above the settling-chamber or main body B of the device, as shown and described.

4. The combination, in a milk-strainer provided with pocket H and strainer G in trap-section B, of the tap or plug L, substantially as shown and described.

5. The combination of receiver A, trap-section B, and straining and discharging section C in a milk-strainer, substantially as specified.

6. The combination of receiver A, fall-breaker E, trap-section B, sediment-trap G H, strainer-section C, and strainer I, substantially as specified.

GEORGE WASHINGTON SUTFIN.

Witnesses:
HIRAM G. TORRENCE,
EDWARD N. SANDAGE.